May 13, 1958 J. J. STRNAD 2,834,223
ADJUSTABLE ECCENTRIC
Filed Sept. 18, 1952 2 Sheets-Sheet 1

INVENTOR
James J. Strnad
BY
ATTORNEY

May 13, 1958 J. J. STRNAD 2,834,223
ADJUSTABLE ECCENTRIC
Filed Sept. 18, 1952 2 Sheets-Sheet 2
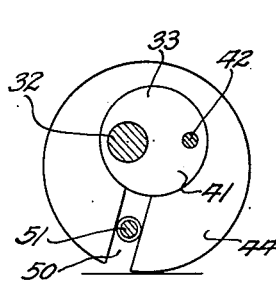
FIG. 7.
FIRST ADJUSTED
POSITION OF ECCENTRICS
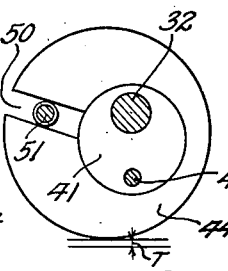
FIG. 8.
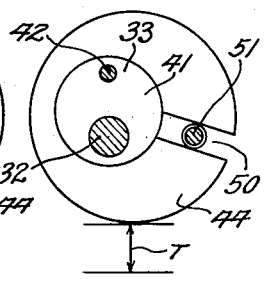
FIG. 9.       FIG. 10.
ROTATIONAL POSITIONS OF ECCENTRICS
WHEN IN FIRST ADJUSTED POSITION
FIG. 11.
SECOND ADJUSTED
POSITION OF ECCENTRICS
FIG. 12.       FIG. 13.       FIG. 14.
ROTATIONAL POSITIONS OF ECCENTRICS
WHEN IN SECOND ADJUSTED POSITION
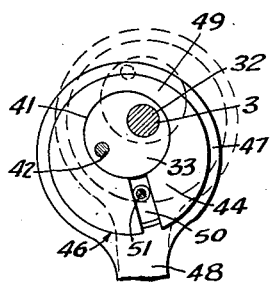
FIG. 5
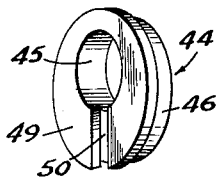
FIG. 6
INVENTOR
James J. Strnad
BY W. N. McDowell
ATTORNEY

United States Patent Office 2,834,223
Patented May 13, 1958

2,834,223
ADJUSTABLE ECCENTRIC

James J. Strnad, Bedford, Ohio, assignor to Lempco Products, Incorporated, Bedford, Ohio, a corporation of Ohio Application September 18, 1952, Serial No. 310,257

7 Claims. (Cl. 74—571)

This invention, generally considered, relates to an eccentric drive mechanism for machine tools, such as lathes, boring, milling and other power-driven machines of the type in which metal is subjected to cutting, boring or turning operations. More specifically considered, the invention is concerned with an improved adjustable motion-producing mechanism adapted for employment in such tools for the purpose of imparting relative traversing movement to the power-actuated work-supporting and cutting devices of such tools.

One of the primary objects of the invention is to provide an improved adjustable eccentric drive mechanism for imparting feeding movement to the cutting and work-supporting parts of a machine tool in such a manner that the cuts produced in the work by the cutting tool are, in each cycle of rotation of the work, disposed in part in parallel paths, as contrasted with the helical cuts produced in work by tools of the prior art.

Another object of the invention is to provide a novel motion-transmitting mechanism for imparting automatically an intermittent feeding or traversing movement to the relatively movable cutting tool and work-supporting parts of a machine tool.

A further object of the invention is to provide a manually adjustable, variable throw, motion-imparting mechanism which is adapted to be driven by the spindle or power shaft of a machine tool for imparting variable speed traversing movement to an associated tool-supporting carriage.

A still further object of the invention is to provide an adjustable feed mechanism for the carriage of a turning lathe, wherein the mechanism includes dual inner and outer eccentric members which are relatively adjustable and mounted on the power shaft of the lathe in a manner by which variable throw motions of said eccentric members are obtained, such throw motions being used in imparting incremental movements of varying degree to an associated carriage-advancing screw shaft, such incremental movements being in relation to each complete cycle of rotation of the power shaft or spindle of the lathe.

With these and other objects and advantages in view, the invention consists in the novel features of construction, combinations of elements and arrangements of parts, hereinafter more fully described and set forth in the accompanying drawings, wherein:

Fig. 5 is a view similar to Fig. 4, but illustrating the eccentric devices in different operating positions;

Fig. 6 is a detail perspective view of the outer eccentric member provided by the variable throw feed-screw-operating mechanism of the present invention;

Fig. 7 is a diagrammatic view showing the inner and outer eccentric members of the variable throw mechanism in an arbitrarily assumed "first" adjusted position of operation about the axis of the lathe power shaft and wherein the inner eccentric member is shown as occupying a position at 90 degrees of rotation from its position as shown in Fig. 4;

Fig. 8 is a similar view, disclosing the inner and outer eccentric members in the positions which the same assume when rotated by movement of the associated lathe power shaft through a quarter of a turn of shaft rotation from the position thereof disclosed in Fig. 7;

Fig. 9 is a similar view, disclosing the eccentric members while still retained in the first or Fig. 7 position of relative adjustment about the axis of the lathe power shaft, but disclosing the positions of said members after the power shaft or spindle of the lathe has been rotated through one-half turn of rotation from the position of Fig. 7;

Fig. 10 is a similar view with the eccentric members still retained in their first adjusted position of Fig. 7, but after having been rotated three-quarters of a turn of shaft rotation;

Figures 1, 2, 3, 4:
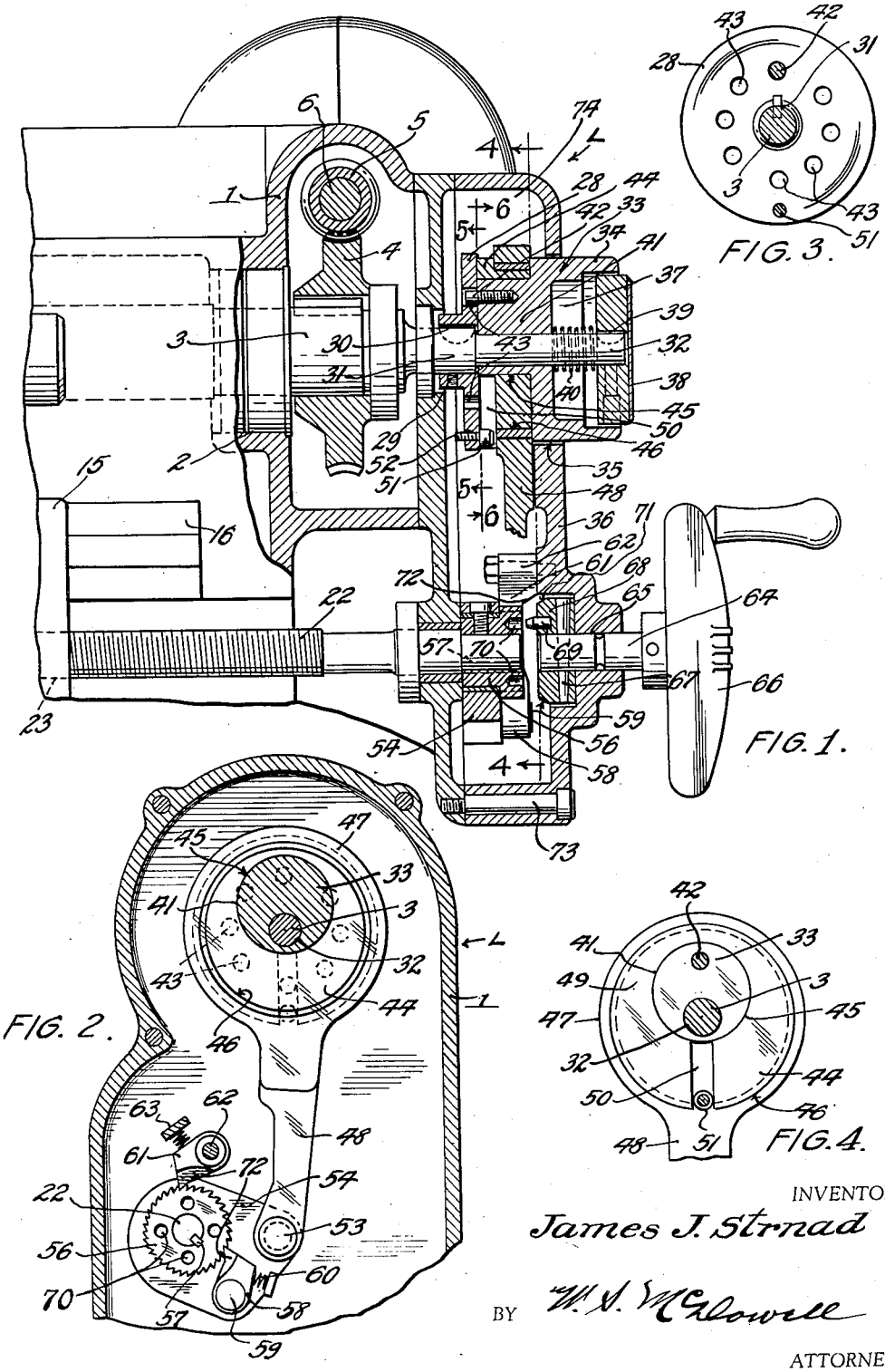
Fig. 1 is a fragmentary vertical longitudinal sectional view taken through a lathe, and disclosing in vertical section the eccentric variable-throw mechanism employed for imparting intermittent movement to the carriage feed screw of the lathe.
Fig. 2 is a vertical transverse sectional view taken through said mechanism on the plane indicated by the line 4—4 of Fig. 1.
Fig. 3 is a detail transverse sectional view on the line 5—5 of Fig. 1, and illustrating the apertured adjusting and driving plate of the feed screw-operating mechanism of the present invention.
Fig. 4 is a similar view on the plane indicated by the line 6—6 of Fig. 1, illustrating the dual inner and outer eccentric members employed in the feed screw drive mechanism of the present invention.

Fig. 11 is a similar view disclosing diagrammatically the inner and outer eccentric members of the drive mechanism when the same are relatively adjusted by turning the same bodily about the axis of the power shaft or spindle of the lathe from the first adjusted position of Fig. 7 to a second adjusted position in which the inner eccentric member is manually moved 180 degrees from the position of Fig. 4;

Fig. 12 is a similar view with the eccentric members retained in their second position of adjustment but illustrating their relative positions when the lathe shaft is rotated a quarter of a turn from its position of Fig. 11;

Fig. 13 is a similar view with the members rotated one-half turn by the power shaft or spindle of the lathe from the position thereof indicated in Fig. 11; and Fig. 14 is a similar view with the members rotated by the power shaft three-fourths of a turn.

Referring more particularly to the drawings, there has been illustrated, in part, a lathe L to which the adjustable eccentric drive mechanism of the present invention may be applied. The lathe, itself, comprises a rearwardly positioned housing 1, which is equipped with bearings 2 for the rotatable support of a work-receiving, power-driven shaft or spindle 3. As shown in Fig. 1, this shaft or spindle has, in this instance, keyed thereon at its rear end a worm gear 4, the latter meshing with the teeth of a worm 5 which is mounted in connection with a transversely journaled motor-driven shaft 6.

The shaft or spindle 3 is arranged longitudinally of the lathe and the front end thereof, not shown, is arranged to carry the normal work-supporting arbor, also not shown.

The lathe further comprises a carriage 15, which, as shown in Fig. 1, is mounted on one side of the lathe for confined sliding movement in a linear course of travel, preferably on parallel stationary guides 16 carried by the bed of the lathe. In the same manner, the carriage 15 carries a transversely movable tool slide, and associated adjustable supporting members for a cutting tool, not shown.

In effecting movement of the carriage, use is made of a feed screw 22, which extends longitudinally of the lathe and is journalled in connection therewith, the threads of the screw being received in a threaded bore 23 formed in connection with the carriage.

As previously stated, the present invention provides an improved intermittently operating variable throw mechanism for transmitting automatically movement from the power-driven shaft or spindle 3 of the lathe to the carriage feed screw 22. As shown, this mechanism comprises in a preferred form a plate 28 having a hub 29 which is keyed as at 30 on the reduced rearward region 31 of the shaft or spindle 3. Beyond the region 31, the shaft or spindle 3 includes a further diametrically reduced extension 32.

Loosely positioned on the shaft extension 32 for sliding and rotating movement relative thereto is an inner or primary eccentric member 33. In this instance, the member 33 provides a body including a hollow circular knob 34 which is arranged to occupy an opening 35 provided in a vertical cover member or plate 36 provided at the rear of the lathe housing. The knob 34 extends beyond the wall of the cover member so that it may be grasped for manual rotation.

The interior of the knob 34 is formed with a chamber 37. Positioned in the open end of this chamber is a dial plate 38. This plate is formed with an axial opening for the reception of the outer end of the shaft extension 32 to which the dial plate is keyed as at 39. A coil spring 40, surrounding the extension 32, is positioned between adjacent vertical surfaces of the chamber 37 and the dial plate 38, the expansive energy of the spring 40 being used to press the knob 34 and the inner or primary eccentric member 33 generally in an inward or forward direction.

The eccentric member 33 is further formed to include a forwardly or longitudinally extending circular hub projection 41 which is disposed in eccentric relation to the longitudinal axis of the shaft or spindle 3 on which it is mounted. The hub projection carries a forwardly extending threaded pin 42. The outer end of this pin is adapted to be positioned selectively in any one of a plurality of openings, shown at 43, arranged in circular spaced order in the plate 28, whereby to cause the eccentric member 33 to rotate in unison with the shaft or spindle 3. However, by grasping its outer portion, as represented by the knob 34, the inner eccentric member 33 may be drawn bodily outwardly, against resistance offered by the spring 40, thus retracting the projecting end of the pin 42 from a particular opening 43 in which it has been positioned. This action permits of rotation on the inner eccentric member 33 about the axis of the shaft 3, or its extension 32, so that the forward end of the pin 42 may be positioned in other of the openings 43 of the plate 28. By the coupling provided through the pin construction 42, it will be seen that when said pin is positioned in one of the openings 43 of the plate 28, the said inner or primary eccentric member will rotate in unison with the shaft or spindle 3, the resulting eccentric throw-producing motion of the member 33 being varied in accordance with the particular opening 43 selected by the machine operator in which to insert the forward end of the pin 42. The shank of the pin 42 is threaded or otherwise firmly fitted into the opening provided therefor in the eccentric hub projection 41 of the member 33.

In conjunction with the inner eccentric member, I employ an outer complemental eccentric member 44. The latter, as shown particularly in Fig. 6, comprises a disklike body in which is formed an opening 45. This opening is disposed in eccentric relation to the true axis of the member 44, the same being adapted to rotatively receive the eccentric hub projection 41 of the member 33. The wall surfaces of the opening 45 have close-fitting engagement with the outer peripheral surface of the projection 41. Also, the member 44 includes an outer circular peripheral surface 46, which receives the ring-shaped upper end 47 of a reciprocatory pawl-actuating follower 48. The front face 49 of the outer eccentric member 44 is provided with a radially extending slot 50. This slot is adapted ot receive the headed rear end of a stud 51, the shank of which is threaded into an opening 52 provided in the plate 28, whereby to produce turning movement of the member 44 at all times in unison with the shaft 3.

The follower 48 extends downwardly, as shown in Fig. 2, and has its lower end pivotally connected as at 53 to the outer end of an oscillatory pawl-supporting arm 54, the latter being mounted for turning movement on the hub of a ratchet wheel 56 keyed as at 57 to the rear end of the screw shaft 22.

Peripherally, the ratchet wheel is formed with teeth which are normally engaged by the inner end of a spring-pressed pawl 58, which is pivotally mounted as at 59 on one side of the arm 54, so that the inner or free end of the pawl will be engaged with the teeth provided on the ratchet wheel. A spring 60 cooperates with the pawl 58 to maintain the same normally in contact with the ratchet wheel teeth. Also, a second pawl 61 is pivotally connected as at 62 with the detachable cover plate 36, so that the free end of the pawl 61 will engage with the teeth of the ratchet wheel, this engagement being assured by a spring 63 pressing on the inner or free end of the pawl 61. With this construction, it will be evident that as the follower 48 is reciprocated in response to the variable-throw motion of the eccentric members 33 and 44, said follower will serve to impart oscillatory motion in selected degree to the arm 54. As the follower moves upwardly on its active stroke, the pawl 58 engages the teeth of the ratchet wheel 56 to impart incremental rotation to the screw shaft 22. As the follower moves downwardly on its idle or return stroke, the inner or free end of the pawl 58 rides over the teeth of the ratchet wheel without rotating the same. The pawl 61, during such return movement of the pawl 58, cooperates with the teeth of the ratchet wheel to prevent movement thereof opposed to that produced by the pawl 58.

Through the use of this variable-throw eccentric mechanism, intermittent rotation through different degrees of travel are imparted to the screw shaft from the constantly rotating power shaft or spindle of the lathe. By adjusting the inner and outer eccentric members relative to each other and with respect to the axis of the power shaft, the stroke or throw of the pawl-actuating follower may be adjusted from a neutral or zero throw position, as indicated in Fig. 4, to a maximum or full stroke throw as illustrated in Fig. 13.

In Figs. 7 through 14 of the drawings, there have been illustrated various adjusted and rotated positions of the dual eccentrics employed in obtaining a desired ratio of carriage travel to spindle rotation. Thus in Fig. 7, the inner and outer eccentrics are shown in a position on the shaft 3 in which the pin 42 is assumed to have been inserted in an opening 43 of the plate 28 at a position substantially 90 degrees from the neutral position disclosed in Figs. 3, 4 and 5.

Figs. 7, 8, 9 and 10 illustrate the eccentrics when the same are retained in their "first adjusted" position by the insertion of the pin 42 into a selected plate opening 43 and the eccentrics then rotated with the shaft 3 through approximately 270 degress of movement thereof. Fig. 7 shows the position of the parts when the shaft is at the start of one of its cycles of rotation. Fig. 8 illustrates the arrangement of the eccentric members when in said first adjusted position and after the shaft has been rotated approximately 90 degrees with respect to the position thereof disclosed in Fig. 7. Fig. 9 illustrates the positional order of the eccentric members when the shaft has been rotated through 180 degrees of movement from the position illustrated in Fig. 7 and in Fig. 10 after rotation of 270 degrees. The complete throw or length of stroke produced by the motion of these eccentric members when in their "first" position of relative adjustment is indicated at T in Figs. 8, 9 and 10.

In Figs. 11–14, the same diagrammatic arrangement is followed as set forth in Figs. 7–10, except that in Figs. 11–14 the pin 42 of the inner eccentric member is assumed to have been placed in an opening 43 of the plate 28 in obtaining what may be termed for convenience in description, a "second adjusted" position of operation. The inner eccentric member 41 is assumed to have been rotated about the axis of the shaft 3 until it is approximately 180 degrees from the position occupied thereby in Figs. 3, 4 and 5. In this "second adjusted" position, it will be noted that maximum throw or stroke length is adapted to be imparted to the follower 48. Fig. 11 shows the relationship of the parts when arranged in said "second adjusted" positional order and at the beginning of a complete cycle of rotation on the part of the shaft 3, Fig. 12 shows the positions of the eccentric parts while retained in their "second adjusted" positional order and after the same have been rotated by the shaft 3 through an arc of approximately 90 degrees from the position of Fig. 11. Fig. 13 discloses the positions of said eccentric members when still in their "second adjusted" positional order after having been rotated by the shaft 3 through an arc of 180 degrees from the starting position of Fig. 11. The throw of the eccentric members when the same are in their "second adjusted" position has been indicated in Fig. 13 by the broken lines shown at T, which, it will be observed, are about twice the length produced by the motion when the eccentric members are arranged in the above defined "first adjusted" position of Fig. 9. It will be understood that by varying the number of openings shown at 43 in Fig. 3 of the drawings, desired variations in the length of the stroke may be provided in addition to those illustrated.

In order to rotate the screw shaft 22 manually so that the carriage 15 may be shifted rapidly back and forth on its guide 16 independently of the controlled micro-feed produced by the variable motion eccentric means, the present invention provides a manually rotated shaft shown at 64. This shaft is slidably supported in bearings 65 carried by the cover plate 36. The outer end of the shaft 64, which is disposed beyond the wall 36, has fastened thereto the hub of a hand wheel 66, which may be conveniently grasped in order to apply manual rotative forces to the shaft 64. The inner end of the shaft 64 has pinned thereto, as at 67, a clutch disk 68. In this instance, the disk is formed with a forwardly projecting stud 69 which is receivable in any one of a plurality of openings 70 formed in the rearward face of the hub region of the ratchet wheel 56. It will be apparent that when the power shaft 3 is at rest, the carriage may be moved back and forth on its guide by manual effort by forcing the shaft 64 inwardly and into clutched engagement with the rear end of the screw shaft 22, such clutched engagement being effected by the entry of the stud 69 into one of the openings 70 of the ratchet wheel 56. It will be further noted that the disk 68 is provided with a tapered periphery 71. This peripheral portion of the disk is adapted to engage with relieved or angular surfaces 72 provided on the pawls 58 and 61, so that as the clutch disk moves inwardly with the shaft 64, the conical surfaces 71 through contact with the pawl surfaces 72 serve to oscillate said pawls against the resistance offered by their springs, moving the pawls to positions in which the inner or free ends thereof are spaced from contact with the teeth of the ratchet wheel 56. This permits the manually operated shaft when forced inwardly and rotated to apply corresponding rotative forces to the screw shaft of the lathe carriage.

The simplicity of the construction will be apparent by reference to the drawings. To change the length of the stroke produced by the eccentric mechanism, it is merely necessary to grasp the knob 34 and pull the same outwardly against the pressure of the spring 40. The desired adjustment may then be produced by rotating the knob 34 until an index pointer thereon registers with a desired setting of a numerical scale, not shown, which may be applied to the face of the dial plate 38. While the knob 34 may be rotated on the shaft 3 relative to the outer eccentric member in obtaining such variable stroke lengths, after a given adjustment has been once fixed, as caused by the entry of the stud 42 into one of the selected openings 43, both the inner and outer eccentric members rotate in unison with the shaft 3 and for all intents and purposes constitute one part.

The cover member or plate 36 is adapted to be detachably connected with the body of the lathe housing by removable bolts shown at 73. When the cover plate is thus attached, as shown in Fig. 3, the same encloses a chamber 74 in which the variable stroke transmission is housed. This chamber may be provided with a suitable lubricant for the purpose of reducing part wear and ratchet noises.

Various changes in part design and arrangements may be made, and while I have illustrated and described in detail a single preferred embodiment of the present invention, nevertheless, it will be understood that such construction is subject to certain modification without departing from the spirit and scope of the invention as the same have been expressed in the following claims.

I claim:

1. Eccentric drive mechanism comprising a frame; a power-driven member supported for rotation in said frame; a coupling plate mounted on said member for rotation therewith, said plate being formed with a plurality of spaced openings disposed in circular order about its axis of rotation; an inner eccentric member rotatably and slidably positioned on said power-driven member, said eccentric member being formed with a circular body extending outwardly through an opening formed in said frame for exterior manipulation, said body being mounted concentrically on said driven member, the body of said eccentric member further including an internal chamber opening to its outer side; an indexing device positioned rigidly on said power-driven member and arranged within said chamber, spring means disposed between said indexing device and said inner eccentric member; an eccentrically disposed hub extension having a circular outer periphery forming a part of said inner eccentric member; a pin projecting forwardly from said hub extension receivable selectively in the openings of said plate, said pin serving to rotate said inner member in unison with said plate and power-driven member in all positions of rotational adjustment of the inner eccentric member on said power-driven member; a second outer eccentric member having a circular opening therein slidably and rotatably receiving the hub extension of said first-named inner eccentric member; and stud means carried by said plate and engaging said outer eccentric member for causing the latter to rotate in unison with said plate and power-driven member.

2. Eccentric drive mechanism as defined in claim 1, wherein said second-named eccentric member is provided with a radially extending slot, said stud means projecting from an adjacent face of the plate on the power-driven member and disposed in constant engagement with the walls of the radial slot to produce movement of the second-named eccentric member in unison with said power actuated member.

3. A variable throw eccentric mechanism comprising: a drive shaft; a plate mounted on and rotatable with said shaft, said plate being formed with a flat circular face in which is formed a plurality of spaced circularly disposed sockets arranged concentrically about the longitudinal axis of said shaft, said shaft projecting beyond said face; an inner eccentric member supported for rotational and longitudinal adjustment on the projecting portion of said shaft; an outer eccentric member having an eccentrically disposed circular opening in which the inner eccentric member is movably positioned, said outer eccentric member having a radially slotted flat circular face disposed in adjoining relation with the face of said plate; a drive projection carried by said plate extending into the radial slot of said outer eccentric member to produce rotation of said outer eccentric member in unison with the rotation of said shaft and plate; a stud projecting rigidly from said inner eccentric member for selective positioning in a socket of said plate upon manually effected longitudinal and rotational adjustment of said inner member on the projecting portion of the shaft; and spring means engaging said inner eccentric member for resiliently and removably retaining said stud in a selected plate socket, whereby to drive and maintain the inner eccentric member in predetermined but variable driving relation with said face plate.

4. A variable throw motion-transmitting mechanism comprising: a housing; a power-driven member rotatably supported in said housing, said housing having walls defining an internal chamber; a plate rotatable with said drive member; an inner eccentric member embodying a throw-adjusting knob positioned for rotational and longitudinal movement on said drive member, said knob being arranged in part within said chamber and projecting through an opening provided therefor in a wall of said chamber to the exterior of said housing for external manipulation, said inner eccentric member being formed with an inwardly extending eccentric hub portion arranged within said chamber; spring-pressed coupling means releasably uniting the hub of said knob in driving relation with said plate and permitting movement of said inner eccentric member between various positions of rotational adjustment about the longitudinal axis of said driven member; a second eccentric member supported on the outer surface of the hub portion of said inner eccentric member in immediately adjacent relation to said coupling plate; and other coupling means connecting said plate and said second eccentric member for unified rotational movement.

5. Variable throw motion-transmitting mechanism as defined in claim 4, including an indexing member carried by said power-driven member externally of said housing, said indexing member having a circumferential edge disposed in immediately adjoining relation to the knob of said inner eccentric member.

6. A variable throw motion-transmitting mechanism comprising: a rotatable drive member; a coupling plate carried by said drive member for rotation therewith; an outer eccentric member encompassing said drive member adjacent said plate and formed with a circular outer peripheral surface and a circular opening disposed in eccentric relation to the peripheral surface of said outer eccentric member; means connecting said outer eccentric member for unified rotational movement with said coupling plate; an inner eccentric member slidably and rotatably mounted on said drive member and formed with an outwardly extending knob portion and an eccentric hub portion extending into and occupying the circular opening of said outer eccentric member; and means on said inner eccentric member engageable with said coupling plate to establish a unified driving relation therebetween, said last-named means being disengageable from said coupling plate to permit of rotational adjustment of said inner eccentric with respect to said drive member and said outer eccentric.

7. A variable throw eccentric power-transmitting mechanism, comprising: a housing; a power driven member rotatably mounted in said housing; a coupling plate carried by said member for rotation in unison therewith; an inner eccentric member including a circular knob portion mounted axially on said driven member for independent rotational and sliding movement thereon, the knob portion of said inner eccentric member extending through an opening in said housing to provide an exteriorly accessible, manually operable part, the exteriorly accessible part of said inner eccentric member being formed with an open-sided chamber; said inner eccentric member further including an inwardly extending cylindrical hub portion disposed in eccentric relation to said power-driven member, the hub portion of said inner eccentric member having a flat inner face arranged adjacent the outer face of said coupling plate; separable interfitting pin and socket means formed with the interfacial portions of said hub and coupling plate for detachably uniting said inner eccentric member with said plate for rotation in unison therewith and to maintain rotational positions of adjustment of said inner eccentric member about the longitudinal axis of said power-driven member; an indexing disk fixed to said power-driven member and occupying the chamber of the exteriorly accessible part of said inner eccentric member; a coil spring interposed between said disk and said inner eccentric member, said spring serving to maintain said pin and socket means in interfitting engagement; an outer eccentric member rotatably carried on the hub portion of said inner eccentric member; and a constantly engaged power-transmitting stud and slot means joining said plate and outer eccentric member for rotation in unison.

References Cited in the file of this patent
UNITED STATES PATENTS

| | | |
|---|---|---|
| 235,022 | Ridgway | Nov. 30, 1880 |
| 665,868 | Holtgen | Aug. 14, 1900 |
| 835,197 | Parkes | Nov. 6, 1906 |
| 1,418,874 | Knowlton | June 6, 1922 |
| 1,466,467 | Burt | Aug. 28, 1923 |
| 1,976,125 | Haas | Oct. 9, 1934 |
| 2,067,399 | Hughes | Jan. 12, 1937 |
| 2,265,222 | Benes | Dec. 9, 1941 |
| 2,568,937 | Stueland | Sept. 25, 1951 |
| 2,583,864 | Malmsten | Jan. 29, 1952 |

FOREIGN PATENTS

| | | |
|---|---|---|
| 591,331 | France | July 2, 1925 |